United States Patent [19]

Hollabaugh et al.

[11] 4,131,882
[45] Dec. 26, 1978

[54] DIGITAL TWO-WIRE IRRIGATION CONTROL SYSTEM WITH FEEDBACK

[75] Inventors: Michael D. Hollabaugh, San Jose; Vinod Panday, Pomona, both of Calif.

[73] Assignee: Clemar Manufacturing Corporation, Glendora, Calif.

[21] Appl. No.: 644,535

[22] Filed: Dec. 29, 1975

[51] Int. Cl.² ............................................. H04B 3/00
[52] U.S. Cl. ................................. 340/310 A; 340/151; 340/310 CP
[58] Field of Search ........ 340/310 R, 310 A, 310 CP, 340/408, 226, 152 R, 152 T, 150, 171 R, 213.1, 151

[56] References Cited

U.S. PATENT DOCUMENTS

| | | | |
|---|---|---|---|
| 3,445,814 | 5/1969 | Spalti | 340/151 |
| 3,508,243 | 4/1970 | Nyfeler et al. | 340/310 A |
| 3,729,710 | 4/1973 | Sherwin | 340/310 A |
| 3,733,586 | 5/1973 | Lusk et al. | 340/310 R |
| 3,803,491 | 4/1974 | Osborn | 340/310 A |
| 3,810,096 | 5/1974 | Kabat et al. | 340/310 CP |
| 3,930,246 | 12/1975 | Campbell | 340/213.1 |

OTHER PUBLICATIONS

Hollabaugh, *Encoder/Decoder System*, May, 1973.

Primary Examiner—John W. Caldwell, Sr.
Assistant Examiner—James J. Groody
Attorney, Agent, or Firm—Fulwider, Patton, Rieber, Lee & Utecht

[57] ABSTRACT

A method and apparatus for the control of a number of valves in an irrigation system utilizing only two lines between a central encoder and a number of remotely located decoders. An alternating-current signal on the lines is used both to transmit power to the decoders and valves, and to convey control information in the form of decoder addresses and on/off signals represented in binary form by selectively clipping the alternating-current signal. The encoder includes timing and switching circuitry to effect temporary interruptions of the alternating-current signal, and to detect feedback signals transmitted from the decoders during the interruptions. At each decoder, the received control signals are recovered from the power lines, and each received decoder address is compared with one which identifies the decoder. When a match is found, the received on/off signal is employed to switch a valve and to initiate transmission of a confirmatory feedback signal. A portable operator, which may be connected to the power lines anywhere in the system, monitors the control signals transmitted from the encoder, and transmits special feedback signals which direct the encoder to perform functions selected at the portable operator.

35 Claims, 14 Drawing Figures

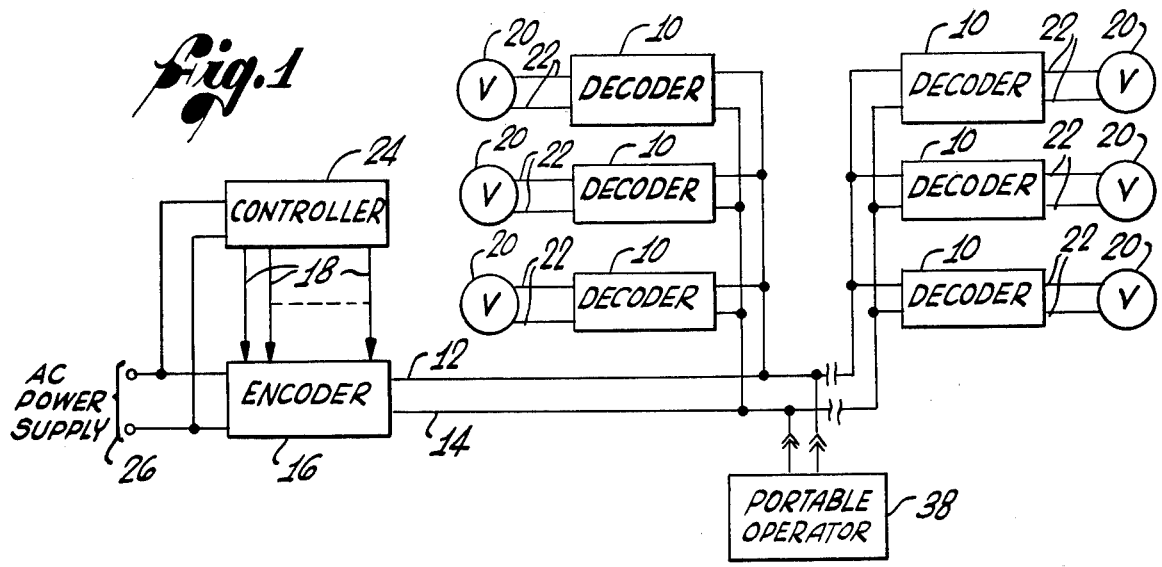
fig.1
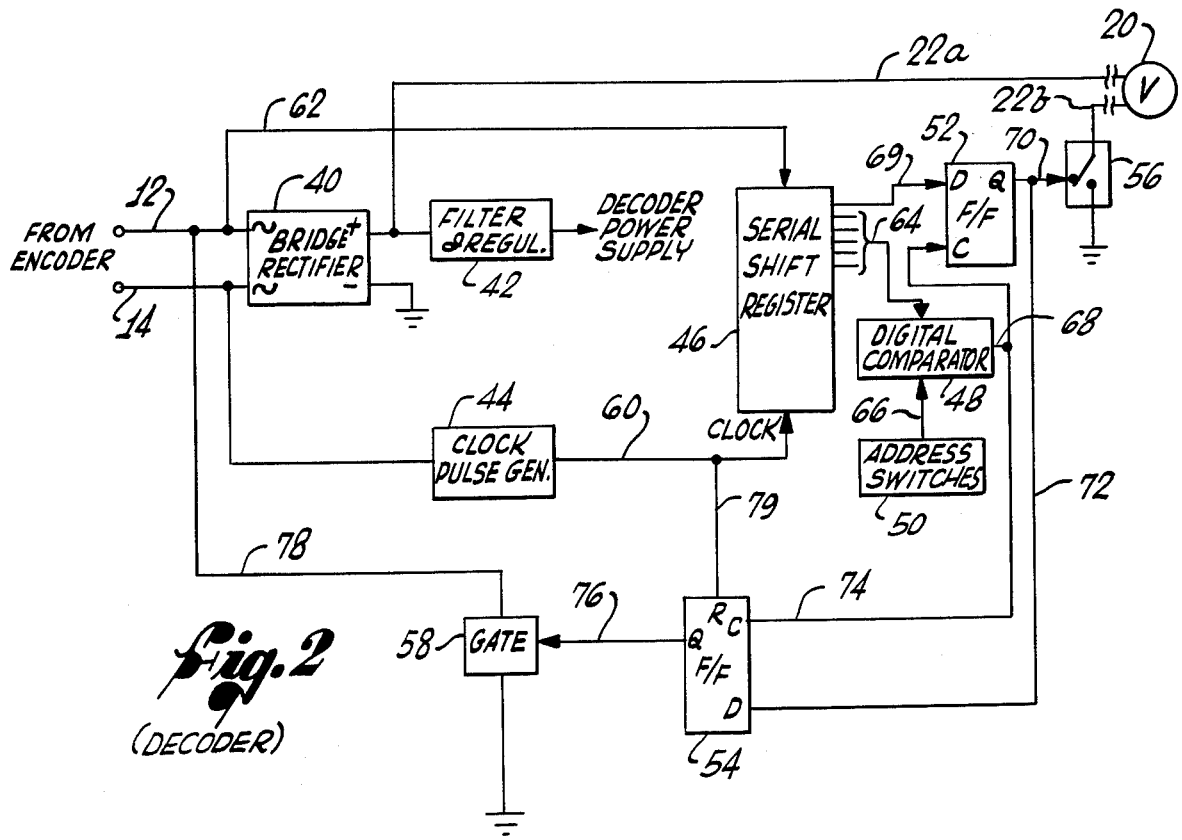
fig.2 (DECODER)

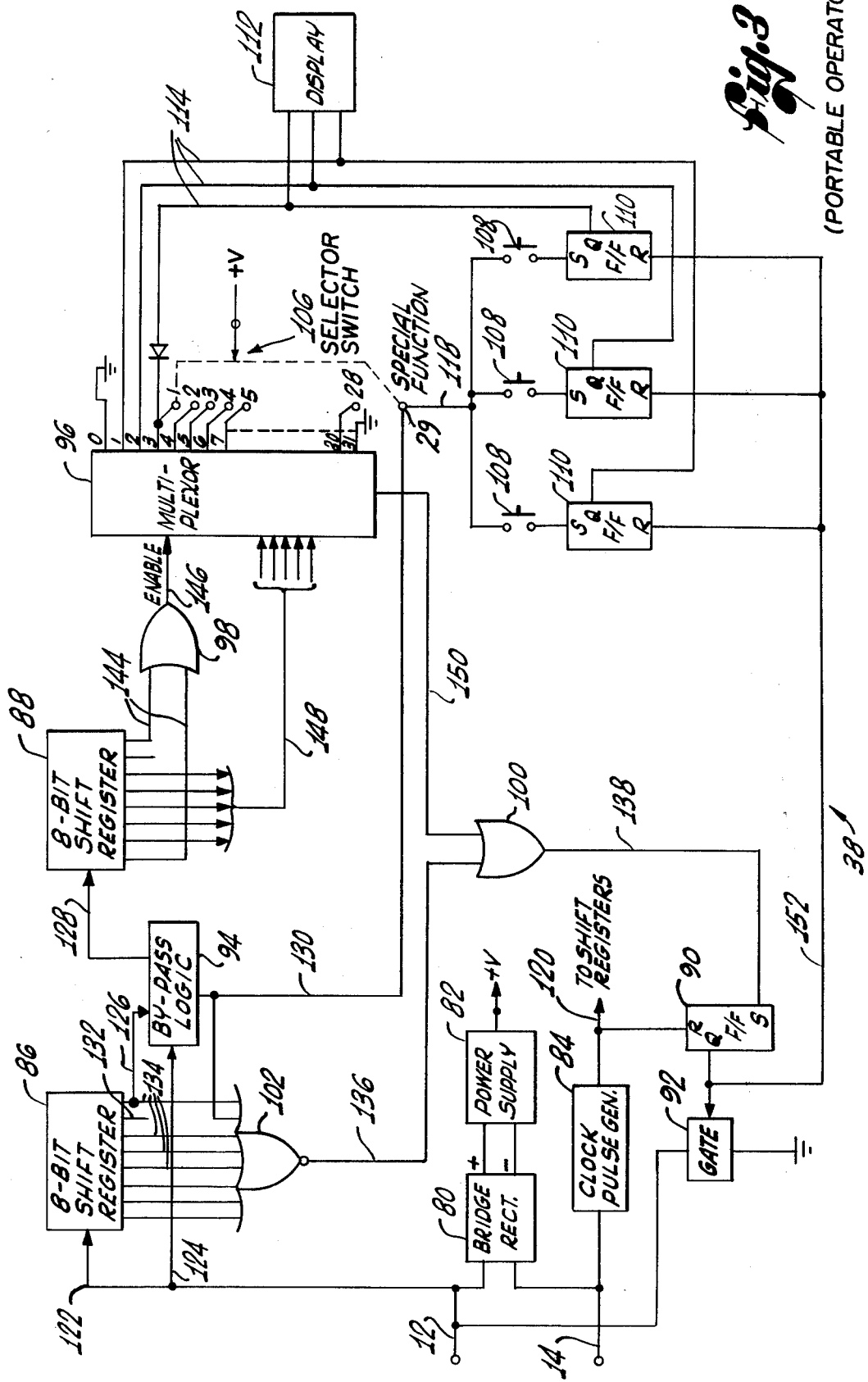
Fig. 3 (PORTABLE OPERATOR)

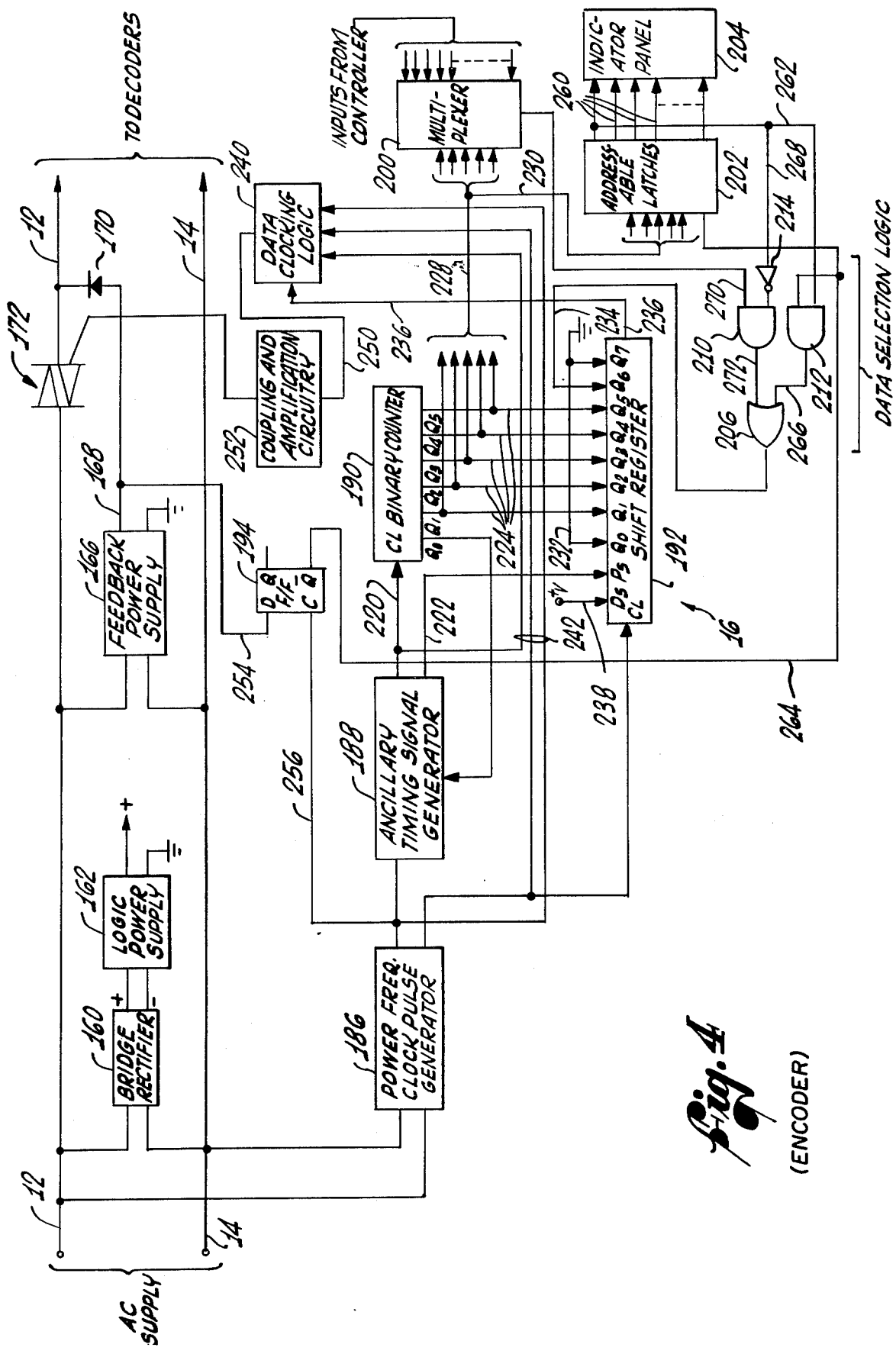

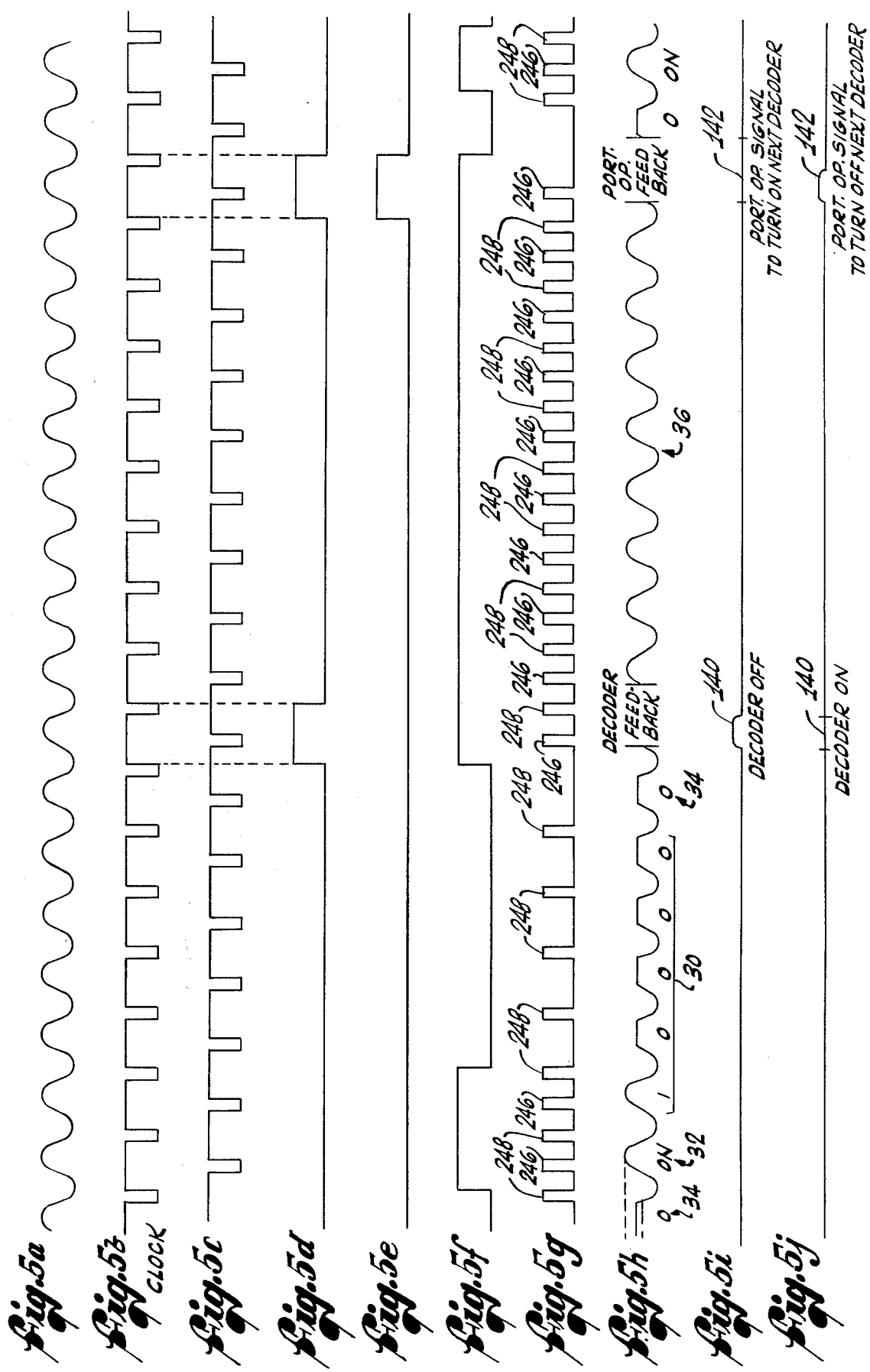

DIGITAL TWO-WIRE IRRIGATION CONTROL SYSTEM WITH FEEDBACK

BACKGROUND OF THE INVENTION

This invention relates generally to irrigation control systems, and, more particularly, to digital systems for the control of a large number of irrigation or sprinkler valves in a desired sequence.

Large irrigation systems, whether used to irrigate agricultural property, sports facilities, or other types of property, include a number of water valves, which are typically solenoid-operated, and which must be opened and closed in a desired and controllable sequence as dictated by the terrain, climate and other factors. For relatively large systems, it is both costly and impractical to run a pair of wires from each of the valves back to a central controller. Accordingly, it is a principal objective in designing such systems to reduce the number of conductors between the central controller and the valve locations to an absolute minimum, i.e., ideally to two wires. Inherently, this objective requires the use of some form of control signal encoder at the central site, and control signal decoders at the valve locations.

Control systems utilizing a central encoder and a number of remote decoders connected to the encoder by only two wires, or by one wire and a ground return, are not unknown. However, such systems have heretofore utilized a technique in which device addresses and control signals are encoded in the form of relatively high-frequency signal bursts, and are then decoded by appropriate filtering at each of the decoders. For example, United States Patent No. 3,821,559, issued in the names of Ueda et al., discloses such a system for the digital control of a number of electrical devices in an automobile.

The present invention is concerned with significant improvements in a digital two-wire control system, of which the basic principles have been disclosed in a publication by one of the inventors. In accordance with these principles, power is transmitted over two wires from a central encoder to a number of decoders in the form of an alternating current. Control information in the form of decoder addresses and corresponding on/off codes is encoded onto the alternating-current signal by clipping portions thereof to indicate binary values of the digits to be transmitted as control information. At each decoder, the control information is decoded, and the alternating-current signal is rectified to provide power to operate valves under the control of the decoded information.

Although the aforementioned basic system provided a solution to the problem of minimizing the number of conductors from the central controller, it has two basic disadvantages in common with other systems of the prior art. First, there is no indication provided at the central site that commands transmitted to the decoders have been received. Second, there is no way of manually overriding the operations of the central controller from a field location, short of manually overriding the operation of each valve at its separate location. Manual control of the system from the field is highly desirable for a number of reasons, such as to permit temporary disabling of a valve for repairs, to permit application of extra water to a newly seeded area, or to permit termination of watering in a flooded area. The present invention is directed to improvements which overcome the aforementioned disadvantages.

SUMMARY OF THE INVENTION

The present invention resides in a digital two-wire irrigation control system of the basic type described, in which each control signal received by a decoder is fed back along the same two wires to the encoder, to provide an indication at the central site that the control signals have been received and acted upon. Briefly, and in terms of a novel decoding apparatus, the invention includes means for decoding control signals received from the encoder, means for comparing received decoder addresses in the control signals with a decoder address associated with the particular decoding apparatus, thus identifying control signals intended for the particular apparatus, means for operating a switchable device in accordance with on/off codes received with the control signals, and means for transmitting to the encoder feedback signals corresponding to the received on/off codes.

In terms of a control system, the invention includes encoding means for encoding decoder addresses and on/off codes onto the power lines, decoding means for recovering the on/off codes directed to a particular decoder, means for transmitting feedback signals corresponding to the recovered on/off codes, means for detecting the feedback signals, and means for storing and displaying information contained in the feedback signals. More specifically, the encoding means includes means for interrupting a transmission of an alternating-current power signal for a brief interval after the transmission of control information to a decoder, and means for transmitting on/off feedback signals from the decoder, during the brief period of interruption of the alternating-current signal.

In accordance with another aspect of the invention, portable control apparatus may be plugged into the power lines at any desired location in the system, to override control functions at the encoder and to substitute control functions selected at the portable control apparatus. Basically, the portable control apparatus includes means for transmitting a feedback signal to the encoder to indicate that the portable control apparatus is connected to the system, decoder means for decoding the control information transmitted by the encoder, manually operated means for selecting which decoders are to be manually controlled, and means for transmitting other feedback signals to the encoder to indicate which decoders have been selected for manual control. The portable control apparatus may also include, as in the presently preferred embodiment, additional switch means for selecting special control functions, such as, for example, advancing the central controller through its valve-actuating sequence one step at a time, or returning the central controller to the starting point of its sequence.

The encoder apparatus of the invention includes address generation means for generating a sequence of decoder addresses, multiplexer means coupled to the address generation means, for selecting each of a number of input signals from the central controller indicative of currently desired on/off conditions, encoding means for encoding the selected address and on/off codes onto the alternating-current power signal, and circuit means for temporarily disconnecting the alternating-current signal and simultaneously detecting a feedback signal transmitted to the encoder. The encoder of the invention further includes memory means for storing decoder status conditions as transmitted in the feedback signals, and display means for visibly indicating the on/off conditions at all of the decoders.

In the encoder of the present embodiment of the invention, the memory means is also utilized for the storage of data fed back from the portable control apparatus, and the encoder further includes data selection means for selecting data either from the multiplexer means, if the portable control apparatus is not presently connected to the system, or from the memory means, if the portable control apparatus is connected to the power lines.

Basically, the method of the present invention includes the steps of encoding decoder addresses and on/off control signals for transmission with a power signal along two wires, decoding the transmitted addresses and control signals at a decoder, and transmitting a decoder feedback signal from the previously addressed decoder, confirming that the on/off control signal has been received. In the presently preferred embodiment, power is transmitted along the lines in the form of an alternating-current signal, and the step of transmitting a feedback signal includes interrupting transmission of the alternating-current signal, and selectively grounding one of the power lines to indicate an on/off condition to be fed back to the encoder. The method further includes the step of storing the decoder feedback signals, at the encoder site, and visibly displaying them as an indication of the on/off conditions at all of the decoders.

The basic method as it relates to use of the portable control apparatus, includes the steps of plugging in the portable control apparatus at a desired point along the two wires from the encoder, automatically transmitting to the encoder a signal indicative of the presence of the portable control apparatus, manually selecting at the portable control apparatus a decoder station to which an "on" signal is desired to be transmitted, or selecting a special control function to be performed, and thereby automatically transmitting a feedback signal to the encoder indicative of which decoder station is to be switched on or which special function is to be performed.

In addition, the steps performed at the encoder during presence of the portable control apparatus are: storing in a memory the on/off signals fed back from the portable control apparatus, detecting that the portable control apparatus is on-line, and accordingly selecting on/off signals from the memory in which the feedback information from the portable control apparatus is stored, instead of the on/off signals multiplexed from the central controller. In other words, while the portable control apparatus is connected to the system, the encoder obtains its on/off control information as fed back from the portable control apparatus itself, instead of from the usual sequence of on/off signals as derived from the controller. Once the portable control apparatus has been disconnected, this is immediately detected at the encoder by the absence of feedback signals from the portable control apparatus, and on/off data is then again multiplexed from the controller inputs.

In the present embodiment of the invention, the feedback signals from the decoders, and the feedback signals indicating the presence of the portable control apparatus, are transmitted during one cycle-time of the alternating-current power signal immediately following the transmission of an address and an on/off code from the encoder. The alternating-current power signal is disconnected for this one cyle, and a direct current is applied to one of the lines to the decoders. At the decoders, and at the portable control apparatus, feedback of an "on" signal is indicated by grounding the line temporarily, and an "off" signal is indicated by leaving the line open-circuited. Thus, the presence or absence of current in one of the lines from the encoder is indicative of the "on" or "off" signal, respectively, being fed back to the encoder. Feedback of other control signals from the portable control apparatus is accomplished during a similar one-cycle interruption of the alternating-current signal, distinct from the first interruption.

It will be appreciated from the foregoing that the present invention represents a significant improvement over the basic two-wire irrigation control system, in that it provides an indication that the control signals transmitted along the two wires to the decoders have, in fact, been received at the decoders. Furthermore, the invention provides for the control of irrigation or sprinkler valves in the field, by slaving encoder operations to the control of the portable control apparatus. Other aspects and advantages of the invention will become apparent from the following more detailed description taken in conjunction with the accompanying drawings.

BRIEF DESCRIPTION OF THE DRAWINGS

FIG. 1 is a block diagram of a two-wire irrigation control system embodying the present invention;

FIG. 2 is a simplified schematic diagram of the decoder of FIG. 1;

FIG. 3 is a simplified schematic diagram of the portable operator of FIG. 1;

FIG. 4 is a simplified schematic diagram of the encoder of FIG. 1; and

FIGS. 5a-5j are voltage and timing waveforms at various points in the encoder.

DESCRIPTION OF THE PREFERRED EMBODIMENT

As shown in the drawings for purposes of illustration, the present invention relates to improvements in digital two-wire irrigation control systems in which both power and control signals are transmitted to a plurality of decoders, indicated by the reference numeral 10, along two conducting wires 12 and 14 from a centrally located encoder 16. Each decoder 10 has at least one electrically actuated valve 20 connected to it by conductors 22. The encoder 16 derives a plurality of on/off signals for the valves 20 from a plurality of lines 18 from a controller 24. The controller 24 may be any device for generating the on/off signals in a desired and preferably controllable sequence, the details of the controller not being of importance to the present invention.

Power is provided to the encoder 16 and controller 24 as shown at 26. The encoder 16 transmits both electrical power and control signals, in the form of decoder addresses and on/off signals, along the two lines 12 and 14 to the decoders 10. The decoders 10 recover the transmitted information from the power lines 12 and 14, and accordingly switch the valves 20 on or off. It will be appreciated, of course, that there may be more decoders 10 than the six illustrated in FIG. 1, and that more than one valve may be controlled by each decoder.

In the apparatus of the present invention, control information, in the form of decoder addresses and on/off signals, is encoded into the power signal transmitted along the lines 12 and 14 from the encoder 16 to the decoders 10. As shown in FIG. 5h, the information is encoded digitally by clipping the upper or positive halves of the usually sinusoidal power signal when a zero is to be encoded, and not clipping the upper halves when a one is to be encoded. As also shown in FIG. 5h, each block of encoded information includes a five-bit decoder address 30, shown in the example as 10000 binary, or 16 decimal, an on/off signal 32, and two delimiting zeros 34. Each block of encoded information is followed by a string of ones 36, i.e., there is a period of time during which the alternating-current wave is left undistorted following transmission of the control information.

In accordance with the present invention, transmission of the alternating-current power signal is interrupted after each block of data is transmitted, and the period of interruption is utilized for the transmission of a feedback signal from the decoder 10 which received the most recently transmitted information. In accordance with a related aspect of the invention, a control device or portable operator 38 may be plugged in at any desired location along the length of the two conductors 12 and 14 to the decoders 10, and utilized to override the on/off signals derived from the controller 24, and to substitute on/off signals selected manually at the portable operator. The discussion which follows will clarify how these feedback and portable operator improvements are implemented in the presently preferred embodiment of the invention.

It will facilitate understanding of the invention if detailed discussion of the encoder 16 is deferred until the details of the decoder 10 and portable operator 38 have been fully described. Accordingly, it can be assumed for the moment that the encoder 16 transmits a waveform of which a typical sample is shown in FIG. 5h. The waveform includes alternating blocks of encoded data and an unmodulated alternating-current signal, the latter being used for clearing and resetting purposes at the decoders 10. As already mentioned, each block of data includes encoded zeros 34 at its beginning and end, a five-bit address code 30, and a single-bit on/off code 32. Following each block of data, which occupies eight cycles of the alternating-current waveform, is a single cycle during which the alternating-current power signal is interrupted. Then follow eight undistorted cycles of the alternating-current waveform, followed again by a single-cycle interruption.

As will be described subsequently herein, the single-cycle interruption following the transmission of the data block is reserved for the transmission of a feedback signal from the decoder 10 to which that data block is addressed, and the single-cycle interruption following the string of clearing "ones" 36 is reserved for the transmission of feedback control signals from the portable operator 38.

As shown in FIG. 2, each decoder 10 of the present invention includes a bridge rectifier 40, a power supply filter and regulator 42, a clock pulse generator 44, a serial shift register 46, a digital comparator 48, a set of address switches 50, two flip-flops 52 and 54, a current switch 56, and a gate 58 for controllably grounding one of the lines 12 from the encoder 16. For purposes of explanation, it will be convenient to refer to one of the lines 12 from the encoder 16 as the hot line, and the other (14) as the common line. Neither line is grounded, but since the bridge rectifier 40 is also utilized as a phase-splitting device, a distinction should be made between its two input terminals.

It will be appreciated from fundamental rectifier theory that the voltage at the rectifier terminal to which the hot line 12 is connected will have a waveform showing only the upper or positive halves of the complete power signal, if any upper halves are present, and that the voltage on the rectifier terminal to which the common line 14 is connected will have a waveform showing only the lower halves of the incoming power signal. Basically, the lower halves of the power signal waveform are utilized to generate clock pulses in the clock pulse generator 44, and are transmitted over line 60 to the clock terminal of the shift register 46, which is a serial-input, parallel-output shift register of conventional design. The data input of the register 46 is received over line 62 from the hot line input of the rectifier 40, and contains the data stream encoded into the upper halves of the power signal. The clock pulse generator 44 merely generates conventional square-wave clock pulses from the semi-sinusoidal signal from the bridge rectifier 40. The data stream on the power lines 12 and 14 to the decoder 10 is therefore continuously shifted through the shift register 46 at a rate equivalent to the power supply frequency.

The digital comparator 48 is supplied by lines 64 from the parallel outputs of the shift register 46 corresponding to the five address bits of the transmitted data, and is also connected to detect zero bits in the first and last positions of the shift register. The digital comparator 48 also receives inputs, as shown at 66, from the address switches 50, which are manually operable to provide a unique address for the decoder 10. The comparator 48 generates an output only when the first and last positions of the shift register 46 are zero, and when the transmitted decoder address corresponds with the settings of the address switches 50. The output from digital comparator 48 on line 68 is connected to the clock input of flip-flop 52, and the on/off bit from the shift register 46 is connected by line 69 to the D input of the same flip-flop. Accordingly, when the digital comparator 48 finds a match, meaning that the control information is intended for this particular decoder 10, the on/off bit is gated into the flip-flop 52 and the Q output of the flip-flop assumes a value representative of the desired on/off condition.

The Q output of the flip-flop 52 is connected to gate the current switch 56, as shown by line 70, so that the valve 20 is switched in accordance with the transmitted on/off information. Moreover, the flip-flop 52 acts as a one-bit memory cell to hold the value of the current on/off condition of the valve 20, so that if the valve should be switched to the wrong condition by some extraneous electrical or mechanical force, the effect of the flip-flop would be to immediately switch the valve to its correct condition again.

The Q output of the flip-flop 52 is also connected, by line 72, to the D input of the other flip-flop 54. The clocking signal for this second flip-flop 54 is derived, over line 74, from the output of the digital comparator 48, so that the Q output of the second flip-flop 54 assumes the same value as the Q output of the first flip-flop 52, when clocked by the signal on line 74 from the digital comparator. This clocking signal on line 74 is passed through a simple R-C time delay circuit (not shown), to ensure that the Q output of the second flip-flop 54 will closely follow the Q output of the first flip-flop 52. The Q output of the second flip-flop 54 is connected by line 76 to actuate and close the grounding gate 58, which is connected by line 78 to the hot line 12.

Thus, when the Q output of the second flip-flop 54 is a one, the gate 58 is effectively closed to short circuit the hot line 12.

It will be apparent that the clock signal on line 74 to the second flip-flop 54 will be generated immediately after a block of input data has been received in the shift register 46. Therefore, the second flip-flop 54 will be clocked at the proper time to generate a feedback signal during the interruption of alternating-current power to the lines 12 and 14 from the encoder 16.

The gate 58 should be of such design as to open again after a brief period of time, regardless of the condition of the Q output of the second flip-flop 54. For example, a silicon-controller rectifier would be suitable for this purpose, since it would cease conducting as soon as the voltage on the hot line 12 was removed. The second flip-flop 54 is reset by a signal on line 79 from the clock pulse generator 44, to avoid grounding the hot line 12 subsequent to the cycle during which the feedback signal is to be transmitted.

As will be appreciated from FIG. 3, the portable operator 38 (FIG. 1) of the invention has many features in common with the decoder 10 described with reference to FIG. 2. The portable operator 38 includes a bridge rectifier 80, direct-current power supply 82, a clock pulse generator 84, two serial-input, parallel-output shift registers 86 and 88 for the incoming data stream, and a flip-flop 90 and gate 92 for developing a feedback signal on the hot line 12. In addition, the portable operator, as illustrated in the simplified schematic of FIG. 3, includes bypass logic 94 for interconnecting the two shift registers 86 and 88, a multiplexer 96, two OR gates 98 and 100, a NOR gate 102, one twenty-nine-position selector switch 106, three special-function switches 108, three corresponding special-function flip-flops 110, and a display device 112 for indicating the state of selected special functions.

The twenty-nine-position switch 106 allows the selection of one of twenty-eight decoders 10 to which an "on" signal is desired to be sent, the other twenty-seven of the twenty-eight decoders being turned off when the portable operator 38 is placed on line. The twenty-ninth position of the switch 106 allows, in conjunction with the three separate switches 108, the selection of a special function to be initiated at the central site. The special functions can be, for example, to reset the controller 24 (FIG. 1) to the starting position in its sequence of operations, to advance the controller one incremental step in its sequence, or to control a particular valve in the system.

The multiplexer 96 has thirty-two inputs, numbered 0-31 in FIG. 3. Twenty-eight of these, numbers 3-30, are derived from the twenty-nine-position switch 106, input numbers 1-3 are derived from the Q outputs of the three special-function flip-flops 110, over lines 114, and input numbers 0 and 31 are permanently connected to ground. The function of the twenty-nine-position selector switch 106 is to connect a positive voltage to one of twenty-eight of the input terminals of the multiplexer 96. If the switch 106 is in one of the positions numbered one through twenty-eight, the positive voltage is applied to a terminal of the multiplexer 96, and if the switch is in the twenty-ninth position, the positive voltage is applied, over line 118, to energize the special-function switches 108. When any of the three special-function switches 108 is then actuated momentarily, the positive voltage is conveyed to the set terminal of a corresponding one of the three flip-flops 110, the flip-flop is set, and its Q output is transmitted over one of the lines 114 to one of the three inputs of the multiplexer 96 numbered 1–3. Consequently, it can be seen that the first, or zero-numbered input of the multiplexer 96 is always connected to ground, as is the last or number 31 input, and that the settings of the selector switch 106 and the three special-function switches 108 together determine which one of the remaining thirty inputs of the multiplexer is connected to a positive voltage. The zero-numbered input of the multiplexer 96 is reserved for the portable operator 38 itself, and, as will be seen, connection of the portable operator to the system is indicated by the presence of a feedback signal following the transmission of an address code comprising all zeros.

It should be noted that input number 3 of the multiplexer 96 can be connected to a positive voltage either by selecting decoder address number 1, or by selecting special function number 3. As will soon become clear, however, this raises no ambiguity in the operation of the system, and a diode 119 is included in one of the lines 114 to input number 3 of the multiplexer 96, to prevent any interaction between the selector switch 106 and the flip-flops 110.

It is also important to note that the selector switch 106 is connected so that, when a particular decoder station is selected, e.g., station number 4, the multiplexer input corresponding to a station number one number less than this is energized, i.e., input number 6, which corresponds to decoder station number 3 for purposes of decoder control. The reason for this offset of one is that it is desirable to effect functions selected at the portable operator 38 as soon as possible after their selection. Accordingly, a feedback signal conveying the message that station number 4 is to be turned on is transmitted immediately following the receipt of a transmission concerning station number 3. As will be seen, the encoder 16 will obtain on/off data from the most recently received portable operator feedback signal if the portable operator 38 is found to be connected to the system.

As with its counterpart in the decoder 10 (FIG. 1), the clock pulse generator 84 of the portable operator 38 derives sixty-cycle clock pulses from the common line 14, and these are utilized to clock the shift registers 86 and 88, as shown at 120. A serial input data stream for the shift registers 86 and 88 is derived from the hot line input terminal of the bridge rectifier 80, and is transmitted over line 122 to the first shift register 86, and over line 124 to the bypass logic 94. Normally, the bypass logic 94 connects the first and second shift registers 86 and 88 in series along the data path comprising lines 126 and 128, thus forming a single sixteen-bit shift register for the incoming data stream. However, when special functions are selected by moving the selector switch 106 to the twenty-ninth position, a positive voltage on line 130 to the bypass logic 94 has the effect of inhibiting the data path on line 126 from the first shift register 86, and enabling the data path through lines 124 and 128 directly to the second shift register 88. Thus, both registers 86 and 88 simultaneously receive serial data. The bypass logic 94 will be explained more fully when the operation of the special-function switches 108 is described.

Seven of the eight parallel outputs of the first shift register 86, i.e., all of the outputs except the on/off bit in the seventh bit-position shown at 132, are connected by lines 134 to the input terminals of the NOR gate 102.

Another input of the NOR gate 102 is derived from the signal on line 130, indicating that special functions have been selected. Consequently, if zeros are present in all positions of the first shift register 86, and if special functions have not been selected, the NOR gate 102 generates a logical "one" output on line 136, which is connected as an input to OR gate 100. The output of OR gate 100 is connected, in turn, by line 138 to the set terminal of the feedback flip-flop 40. As in corresponding elements of the decoder 10 (FIG. 1), the Q output of the feedback flip-flop 40 is connected to the gate 92, to ground the hot line 12 when the Q output of the flip-flop becomes a logical "one".

As mentioned previously, the portable operator 38 has a logical address code of zero, and the presence of the portable operator is detected by an appropriate feedback response when the decoder address transmitted by the encoder 16 (FIG. 1) is zero. It can be seen that the logic just described, i.e., the logic associated with the NOR gate 102, the OR gate 100, and the feedback flip-flop 90 and gate 92, achieves this purpose.

When special functions are selected at the selector switch 106, a positive voltage signal on line 130 prevents the generation of a feedback signal for an address code of zero. Consequently, the encoder 16 (FIG. 1) is unaware of the presence of the portable operator 38, and derives decoder control information from the controller 24 (FIG. 1). In general, the special functions will relate to changes in the preprogrammed controller sequence, so that it is desirable to continue that sequence, except as modified by any selected special function.

As can be seen in FIGS. 5g and 5h, the feedback data from decoders 10 (FIG. 1) are transmitted and received immediately after the transmission of a data block, as shown at 140, but the feedback signals derived from the selection switches in the portable operator 38 are transmitted and received after the transmission of the string of clearing bits between the data blocks, as shown at 142. This distinction in the timing of the feedback signals is effected by transmission of the portable operator feedback signals when the two shift registers 86 and 88 are connected in series. Decoding at the second shift register, and generating a response immediately thereafter, will then effectively delay the feedback response until eight more clock cycles have been generated, i.e., until the following string of clearing bits has been received.

The first and last bits of the second shift register 88 are connected by lines 144 as inputs to OR gate 98, the output of which is connected by line 146 to the multiplexer 96, to enable its operation when both of the inputs to the OR gate 98 are zero. The on/off bit in the second shift register 88 is of no consequence to the portable operator 38, and no connection is made to it. The five address code bits of the second shift register 88 are connected, as shown by line 148, to the address selection inputs of the multiplexer 96. The multiplexer 96, when enabled, operates to select for output the one of its input signals that is selected by the signals on the address selection inputs. Thus, if an address code "4" is received by the portable operator 38, and if the selector switch 106 is in the second position, corresponding to the fourth-position input of the multiplexer 96, an output signal will be generated on line 150 from the multiplexer. This output signal is also connected as an input to OR gate 100, which, as has been described, has its output connected to the set terminal of the feedback flip-flop 90, to initiate transmission of a feedback signal to the encoder 16 (FIG. 1).

As already mentioned above, the selector switch 106 is connected in such a manner that, when a particular decoder station is selected (station number 2 in this example), the multiplexer input which is energized corresponds to a station number which is one number lower than the selected station number, i.e., multiplexer input number 4, which corresponds to decoder station number 1 for purposes of decoder control. By this means, the feedback signal relating to station number 2 will be transmitted after receipt of the station number 1 control information at the portable operator, and immediately before transmission of the station number 2 control information by the encoder 16.

No feedback signals will be generated for any of the other twenty-seven decoders 10 when their corresponding addresses are received, since, in this example, the selector switch 106 has been positioned to place a positive voltage only on the fourth-position input of the multiplexer 96.

If the selector switch 106 is placed in the twenty-ninth or special-function position, and if one of the special-function switches 108 is actuated, a feedback signal will be generated when one of the address codes "1", "2", or "3" is received at the portable operator 38, depending upon which one of the special-function switches has been actuated. When special functions have been selected, by placing the selector switch 106 in the twenty-ninth position, the first shift register 86 is bypassed but is still active. No feedback signal will be generated after receipt of the zero address code in the first shift register, and the encoder 16 (FIG. 1) will be unable to detect the presence of the portable operator 38. The portable operator 38 with the selector switch 106 in the special functions position therefore has no effect on the operation of the system until one of the special function switches 108 is actuated. At that point, the portable operator 38 behaves like a decoder with an address of "1", "2" or "3". If the selector switch 106 is placed in any other position, the first shift register 86 is called into play, and a feedback signal for address code zero is generated, to indicate the presence of the portable operator 38.

As already described, when special functions are selected by placing the selector switch 106 in the twenty-ninth position, the bypass logic 94 effectively bypasses the first shift register 86 and directs the incoming data stream directly to the second shift register 88. It will be appreciated from the foregoing description that the effect of this is to transmit any feedback signal corresponding to the special functions immediately after the receipt of the corresponding data block, i.e., immediately after one of the data blocks with address codes "1", "2" or "3". The reason for transmitting the special-function feedback signals at this time will become apparent from the detailed discussion of the encoder logic, but, for the present, it can be appreciated that, since the special functions do not correspond to specidic decoders, the feedback signals relating to address codes "1", "2" or "3" can be utilized for another purpose, namely the indication of which special function has been selected.

It will be seen that the feedback flip-flop 90 is reset by a signal derived from the clock pulse generator 84, so that there is only a momentary grounding, if any, of the hot line 12. It should also be noted that the Q output of the feedback flip-flop 90 is connected by line 152 to the reset terminals of the special-function flip-flops 110. Therefore, if one of the special-function flip-flops 110 is set by the actuation of a corresponding one of the special-function switches 108, it will remain set only until the transmission of a corresponding feedback signal is initiated by the Q output of the feedback flip-flop 90. This renders the special-function switches 108 momentary in nature, and necessitates their reactuation if a special function is to be repeatedly selected.

As illustrated in FIG. 4, the encoder 16 of the present invention also includes a bridge rectifier 160, connected across the hot and common lines 12 and 14 of the alternating-current power supply, and a d.c. logic power supply circuit 162 derived from the full-wave rectified output of the bridge rectifier. Also connected to the power lines 12 and 14 is a feedback power supply 166, for supplying a relatively low direct voltage to the hot line 12, over line 168 and through a diode 170.

Essentially, the encoder 16 functions to control the flow of alternating current in the lines 12 and 14 to the decoders 10 (FIG. 1) and to derive feedback information by detecting whether the hot line 12 is grounded during periodic interruptions of the alternating-current power supply. It will be appreciated that these functions of coupling output data to the power lines 12 and 14 and decoupling feedback data from the power lines can be implemented in a variety of ways. However, in the presently preferred embodiment of the invention a triac 172 is connected in the hot line 12, and is appropriately gated to control current flow in both directions along the line. The triac 172 can either be gated or not gated at the start of each positive excursion of the line voltage, to encode data onto the lines. Normally it will always be gated at the start of each negative excursion, to provide a clocking signal to the decoders, or conduction can be completely suppressed during feedback time cycles.

When conduction in the forward or positive direction is inhibited by the triac 172, there will still be a small positive excursion provided by the feedback power supply 166. For decoding purposes, this small positive voltage will be detected as a zero, of course.

The encoder 16 also includes a power-frequency clock pulse generator 186, an ancillary timing signal generator 188, a binary counter 190, a parallel-input, serial-output shift register 192, a flip-flop 194 a multiplexer 200, a set of addressable latches 202, an indicator panel 204, an OR gate 206, two AND gates 210 and 212, and an inverter 214.

The power-frequency clock pulse generator 186 derives clock pulses, shown in FIGS. 5b and 5c, from the power-frequency alternating current supplied to the encoder 16, and these clock pulses are utilized in the ancillary timing signal generator 188 to generate two principal timing signals. The first of these, on line 220, is illustrated in FIG. 5d and is utilized to clock the binary counter 190 once in every nine cycles of the alternating-current power signal. It will be seen from FIG. 5h, as already discussed, that information is transmitted by the encoder 16 for eight cycles, and may be received by the encoder for the following one cycle. Accordingly, the clocking signal on line 220 may be thought of as a "receive" signal, consisting of a pulse during each feedback time cycle. The other basic timing signal generated by the ancillary timing signal generator 188 is a "parallel/serial" signal on line 222, used to select the mode of operation of the shift register 192 as being parallel input or serial output. This signal is shown in FIG. 5e. Basically, the shift register 192 operates in serial-output mode at all times except during a portable operator feedback time cycle, which occurs once in every eighteen cycles.

The binary counter 190 has six output stages, designated Q0–Q6 in FIG. 4, and functions to generate decoder addresses on outputs Q1–Q5 for supply over lines 224 to the shift register 192. These decoder addresses are subsequently encoded onto the power lines 12 and 14, and are also utilized to drive address selection logic in the multiplexer 200, via lines 228, and in the addressable laches 202, via lines 230. Since the counter 190 is driven by the "receive" signal on line 220, illustrated in FIG. 5d, it will be appreciated that a new address is required to be generated every two of these counts, and that the binary counter will reset to zero when the highest five-bit count is exceeded. The address bits from the binary counter 190, on outputs Q1–Q5, are transmitted over the lines 224 to the corresponding parallel inputs of the shift register 192, and form the address code in a block of data to be transmitted. The first and last bits in the shift register 192 are grounded, as shown at 232, to ensure that delimiting zeros are transmitted with the data block, and the on/off data bit in the shift register is supplied with data over lines 234 in a manner to be described.

During each portable operator time cycle, the shift register 192 inputs new data in parallel over lines 224, and lines 232 and 234. Then the register 192 is switched to serial-output operation, and its contents are shifted out, over line 236, at a power-frequency clocking rate. Eight data bits (Q0–Q7) are first output, followed by a string of ones, since the serial input lines to the register 192 is held high, as shown at 238, thus generating the clearing ones to be transmitted between each block of data.

The data stream on line 236 is combined, in data clocking logic 240, with clocking signals at the power frequency, derived from the power-frequency clock pulse generator 186 and the ancillary timing signal generator 188 over lines 242. The detailed design of the data clocking logic 240 is not critical to the invention, the only requirement being that its output, on line 244, be consistent with FIG. 5g, in which data pulses are indicated by 246 and clock pulses by 248. The output data and clock pulse stream transmitted over line 250 to coupling and amplification circuitry 252 of conventional design, before application to the gate terminal of the triac 172.

During feedback time cycles, following transmission of each block of data and each block of clearing ones, the triac will not be gated, and the alternating-current signal will be momentarily disconnected from the power lines 12 and 14. The feedback power supply 166 will remain connected to the hot line 12, however, and if the hot line is grounded during the feedback cycle time, the feedback power supply will be short-circuited, and the voltage on line 168 will drop to near zero. Line 168 is connected by line 254 to the D terminal of the flip-flop 194, which is clocked by signals on line 256 from the power-frequency clock pulse generator 186. Consequently, when a gound is applied to the hot line 12 to transmit feedback information, the flip-flop 194 assumes a zero condition, i.e. its $\overline{Q}$ output becomes a one. On the next power-frequency cycle, the flip-flop 194 will be set to a one again, and the $\overline{Q}$ output will fall to zero.

As will be recalled, there are basically two types of feedback signals: decoder feedback signals indicating that control information has been received at a decoder, and portable operator feedback signals controlling decoder operations from the portable operator 38 (FIG. 3). As to feedback signals of the first type, these are latched into the addressable latches 202 as soon as they are received in the flip-flop 194, since the $\bar{Q}$ output of the flip-flop is connected by line 264 to the D input of the latches. Timing signals (not shown) are arranged to enable the latches during the feedback time cycle immediately following transmission of a block of data.

As to feedback signals from the portable operator 38 (FIG. 3), these occur during the time cycle immediately following transmission of clearing ones, and, since the shift register 192 is at that time in parallel-input mode, can be immediately input from the flip-flop 194 to position Q6 of the shift register. It will be recalled from the detailed discussion of the portable operator 38 (FIG. 3) that a feedback signal requesting control of a particular decoder will be transmitted following the previous encoder transmission. The feedback signal can, therefore, be immediately transmitted following its receipt at the encoder, to effect the desired control function. Since the $\bar{Q}$ output of the flip-flop 194 will be zero during portable operator feedback time cycles other that the one in which an "on" signal was transmitted, "off" codes will be transmitted to all other decoders.

It will be apparent that the latches 202 will contain an up-to-date summary of the on/off status of all of the decoders. The latches are connected, as shown by lines 260, to the indicator panel 204, which visibly displays the status of all the decoders 10 in the system.

It will be recalled that, when the portable operator 38 (FIG. 4) is connected to the system, the feedback signal indicating the presence of the portable operator and the feedback signal corresponding to the selection of a special function are transmitted in the time period usually reserved for the transmission of status feedback signals from the decoders 10 (FIG. 1). This time period corresponds to the single-cycle interruption of the alterating-current signal immediately following transmission of a block of decoder control information. Consequently, feedback information relating to the presence of the portable operator 38 (FIG. 3) and to the selection of the special functions is stored in the addressable latches 202. The special functions can then be initiated in the controller 24 (FIG. 1), in accordance with the status of the output lines 260 numbered "1", "2" and "3" from the addressable latches 202. Additionally, an indication of the presence or absence of the portable operator 38 (FIG. 3) is available on line 262 connected to output number "0" from the latches 202.

The $\bar{Q}$ output of the flip-flop 194 is also connected by line 264 as an input to AND gate 212. The latter AND gate 212 is part of the data selection logic used to select on/off data either from the flip-flop 194 or from the multiplexer 200, depending upon the presence or absence, respectively, of the portable operator 38 (FIG. 3). Since the portable operator 38 (FIG. 3) is treated as a decoder with an address code of zero, the output line number "0" from the addressable latches 202 will, as has been explained, contain an indication of whether the portable operator is connected to the system or not. This signal is connected by line 262 to the AND gate 212, the output of which is connected by line 266 an an input to OR gate 208. Thus if the portable operator 38 (FIG. 3) is connected to the system, the AND gate 212 is enabled, and data from the flip-flop 194 is gated through the AND gate 212 and through the OR gate 208, the output of which is connected by line 234 to supply an on/off code as a parallel input to the shift register 192.

The portable operator "on-line" signal on line 262 is also connected by line 268, through the inverter 214, as an input to AND gate 210, the other input of which is obtained by line 270 from the output of the multiplexer 200. The output of AND gate 210 is connected by line 272 as another input of the OR gate 208, so that, when the portable operator 38 (FIG. 3) is not connected to the system, AND gate 210 is enabled, and on/off data is derived from the multiplexer 200 rather than from the flip-flop 194. The multiplexer 200 is also driven by the decoder addresses generated by the binary counter 190, as indicated by lines 228, and generates on its output line 270 a signal equivalent to whichever of its inputs from the controller 24 (FIG. 1) is selected by the decoder address on lines 228.

If the portable operator 38 (FIG. 3) is not connected to the system, it can be seen from FIG. 4 that the encoder 16 obtains on/off control information for transmission to the decoders 10 (FIG. 1) directly from the controller inputs, through the multiplexer 200 and the data selection logic. If, however, the portable operator 38 (FIG. 3) is connected to the system, the encoder 16 obtains on/off control information from the flip-flop 194 rather than from the controller 24 (FIG. 1).

When a selection of a decoder station to be turned on is made at the portable operator 38 (FIG. 3), this generates a feedback signal following the transmission of the clearing bits before a data black including the address corresponding to the selected decoder station. This feedback signal is gated into the flip-flop 194, and, when the encoder 16 next generates a transmission of data, an "on" signal will be derived from the flip-flop and transmitted to the next decoder 10 (FIG. 1), which is always the appropriate one to receive the "on" signal. The decoder 10 (FIG. 1) will then transmit a confirmatory "on" feedback signal which will change the status of that decoder in the addressable latches 202 and the indicator panel 204. Selection of a special function at the portable operator 38 (FIG. 3) causes a change in one of the locations numbered 1, 2 and 3 of the addressable latches 202, the outputs of which are used to initiate the special functions in the controller 24 (FIG. 1).

When the portable operator 38 (FIG. 3) is removed from the system, there is no longer any feedback signal indicative of the portable operator's presence, and this is ultimately reflected in a change in the zero-numbered position of the addressable latches 202. As has been described, this enables AND gate 210 and disables AND gate 212, so that on/off data is obtained from the multiplexer 200 rather than from the flip-flop 194. In other words, the normal sequence of valve operations as determined by the controller 24 (FIG. 1) is resumed. The current status of that sequence is then soon reflected in the addressable latches 202 and the indicator panel 204.

It is believed that anyone of ordinary skill in digital logic design could readily complete the detailed design of the present invention, including the decoder, encoder, and portable operator, from the simplified schematics provided herein. The detailed design involves many matters of mere design choice, and is not believed to be essential to a complete understanding of the invention.

It will be appreciated from the foregoing that the present invention represents an important advance in the art of irrigation control systems. In particular, it provides a two-wire connection between a central controller and encoder and a plurality of decoders, by means of which power and control signals are transmitted to the decoders, and feedback signals indicative of the decoder status are transmitted back to the encoder. Furthermore, the invention provides a portable operator which may be plugged into the system at any desired location in the field, so that the normal sequence of operations as determined by the central controller can be overriden from the field location.

It will also be appreciated that, although a specific embodiment of the invention has been described and illustrated in detail, various modifications may be made without departing from the spirit and scope of the invention. Accordingly, the invention is not to be limited except as by the appended claims.

We claim:

1. For use in a digital control system in which an alternating-current power signal and control signals formed by selective suppression of part of the power signal are transmitted along the same conducting lines from an encoder, decoding apparatus comprising:
   means for decoding control signals, said control signals including decoder addresses and on/off codes, and said means for decoding including rectifier means for separating said control signals from the alternating-current power signal by detecting selective suppression of the power signal;
   means for compraring received decoder addresses with an address associated with said apparatus;
   means for operating at least one switchable device in accordance with a received on/off code if said means for comparing finds a match; and
   means for transmitting to the encoder, during a temporary interruption of the power signal, a feedback signal corresponding to the state of the switchable device after being operated in accordance with said received on/off code, if said means for comparing finds a match.

2. Decoding apparatus as set forth in claim 1, wherein said means for transmitting a feedback signal includes means for momentarily grounding one of the lines from the encoder following receipt of an on/off code for said apparatus.

3. Decoding apparatus as set forth in claim 1, wherein:
   decoder addresses and on/off codes are encoded in binary form onto the alternating-current signal by selective half-wave rectification which selectively suppresses current flow in one direction; and
   said means for decoding further includes
      clock pulse generator means for deriving clock pulses from said alternating-current signal, and
      shift register means for receiving said control signals serially under control of the clock pulses.

4. Decoding apparatus as set forth in claim 3, wherein said means for comparing includes:
   means for comparing first and last stages of said shift register means with a preselected value, to ensure proper registration of said control signals in said shift register means; and
   means for comparing a decoder address field of said shift register means with the address associated with said apparatus.

5. Decoding apparatus as set forth in claim 4, wherein said means for operating a switchable device in accordance with said received on/off code includes storage means for holding said on/off code, whereby said storage means operates to return the device to the desired condition if some external force should move it to another condition.

6. Decoding apparatus as set forth in claim 5, and further including a plurality of manually operable switches for selection of the address associated with said decoding apparatus.

7. Decoding apparatus as set forth in claim 3, wherein said means for transmitting a feedback signal includes means for momentarily grounding one of the lines from the encoder following receipt of an on/off code for said apparatus and during a temporary interruption of said alternating-current signal.

8. For use in a digital irrigation control system in which both alternating-current power and control signals are transmitted along the same conducting lines to a number of decoders, and confirmatory on/off feedback signals are transmitted back from the decoders, encoding apparatus comprising:
   means for encoding and transmitting blocks of control information, including decoder addresses and on/off codes, onto the lines, by selective suppression of part of the power signal;
   means for detecting confirmatory on/off feedback signals from the decoders each feedback signal being transmitted during a temporary interruption of the power signal following each corresponding transmission of a block of control information; and
   means for storing and displaying information contained in said feedback signals as an indication of on/off status conditions at the decoders.

9. Encoding apparatus as set forth in claim 8, wherein said means for encoding and transmitting includes:
   decoder address generation means for generating sequential decoder addresses;
   data selection means for obtaining an on/off code for transmission with each decoder address;
   register means for assembling blocks of control information supplied by said address generation means and said data selection means; and
   coupling means for clipping the power signal on the conducting lines in accordance with data derived from said register means.

10. Encoding apparatus as set forth in claim 9, wherein:
    said coupling means includes half-wave rectification means for selectively suppressing conduction in one direction along the lines in accordance with the data derived from said register means.

11. Encoding apparatus as set forth in claim 10, wherein said means for detecting feedback signals includes:
    means for interrupting transmission of said alternating-current signal temporarily after transmission of a block of control information; and
    means for detecting a change in electrical impedance associated with one of the conducting lines during interruption of said alternating-current signal.

12. Encoding apparatus as set forth in claim 11, wherein said means for detecting a change in electrical impedance includes:
    means for supplying a direct-current signal to one of the conducting lines; and
    means for detecting a voltage condition on the line indicative of a ground connection to the line at one of the decoders.

13. A digital irrigation control system in which an alternating-current power signal and control information are transmitted along the same conducting lines, said system comprising:
- encoding means for encoding and transmitting blocks of control information, including decoder addresses and on/off codes, onto the lines, said encoding means being operable to selectively suppress part of the alternating current power signal and thereby to encode the control information;
- decoding means for recovering the blocks of control information from the conducting lines, comparing each recovered decoder address with an address associated with said particular decoding means, and operating at least one valve in accordance with received on/off codes addressed to said decoding means;
- means coupled with said decoding means, for transmitting, during intervals of temporary interruption of the power signal, feedback signals corresponding to said on/off codes addressed to said decoding means;
- means coupled with said encoding means, for detecting said feedback signals received following transmissions of blocks of control information; and
- means for storing and displaying information contained in said feedback signals as an indication of on/off status conditions at the decoders.

14. A system as set forth in claim 13, wherein:
- said means for transmitting a feedback signal includes means for momentarily grounding one of the lines;
- said means for detecting said feedback signals includes means for disconnecting said alternating-current signal from the lines, means for applying a direct-current signal to one of the lines, and means for detecting a change in voltage on the line during the momentary grounding.

15. A system as set forth in claim 14, wherein said decoding means includes:
- rectifier means for providing a direct-current power source to operate the valve and said decoding means, and for separating the control information from said alternating-current signal;
- clock pulse generator means for deriving clock pulses from said alternating-current signal; and
- shift register means for receiving the control information serially under control of the clock pulses.

16. A system as set forth in claim 14, wherein said encoding means includes:
- decoder address generation means for generating sequential decoder addresses;
- data selection means, for obtaining an on/off code for transmission with each decoder address;
- register means for assembling the blocks of control information supplied by said address generation means and said data selection means; and
- coupling means for clipping said alternating-current signal in accordance with data derived from said register means, said coupling means including half-wave rectification means for selectively suppressing conduction in one direction along the lines.

17. For use in a digital control system in which both power and control signals are transmitted along the same conducting lines from an encoder to a plurality of remote decoders, for the control of a plurality of switchable devices, portable control apparatus connectable to the conducting lines to control the switchable devices in conjunction with the encoder, said apparatus comprising:
- means for decoding control signals transmitted by the encoder;
- means responsive to decoding of control signals addressed to said portable control apparatus, for transmitting feedback signals of a first type to the encoder to indicate that said portable control apparatus is connected to the lines;
- manually operable means for selecting which decoders are to be manually controlled; and
- means for transmitting feedback signals of a second type to the encoder to indicate which decoders are to be manually controlled from said portable control apparatus;
- whereby the transmission of control signals from said encoder is controlled by said portable control apparatus so long as said apparatus is connected to the lines.

18. Portable control apparatus as set forth in claim 17, wherein said manually operable means includes:
- means for selecting a particular decoder to be held in an "on" condition; and
- means for selecting a predetermined control function, other than selecting a particular decoder to be held in an "on" condition, to be performed at the encoder site.

19. For use in a digital irrigation control system in which both power and control signals are transmitted along the same conducting lines from an encoder to a plurality of remotely located decoders, for the control of a plurality of switchable valves, apparatus for the control of said system from any desired location, said apparatus comprising:
- portable control means connectable to the conducting lines to control the switchable valves in conjunction with the encoder, said portable control means including
  - means for decoding control signals, including decoder addresses and on/off codes, transmitted from the encoder,
  - means responsive to decoding of control signals addressed to said portable control means, for transmitting feedback signals of a first type to the encoder to indicate that said portable control means is connected to the lines,
  - manually operable means for selecting decoder control functions, and
  - means for transmitting feedback signals of a second type to indicate control functions to the encoder; and
- control means included within the encoder and including
  - means for detecting feedback signals of the first type and thereby determining whether said portable control means is connected to the lines,
  - means for decoding feedback signals of the second type, and
  - means for selecting for transmission on/off codes as determined by said feedback signals of the second type instead of as determined by a normal preselected sequence of valve operations.

20. Apparatus as set forth in claim 19, wherein said manually operable means includes:
- means for selecting a particular decoder to be held in an "on" condition; and
- means for selecting a predetermined control function, other than selecting a particular decoder to be held in an "on" condition, to be performed at the encoder site.

21. Apparatus as set forth in claim 20, wherein:
said means for transmitting feedback signals of the second type includes means for transmitting an "on" feedback signal following receipt of a decoder address which was transmitted immediately before one corresponding to a decoder selected by said manually operable means, and for transmitting "off" feedback signals following receipt of other decoder addresses;
said means for selecting on/off codes at the encoder includes storage means for storing received feedback signals of the second type, and means for reading on/off signals from said storage means if said portable control means is connected to the lines, whereby on/off signals directed to the decoders are derived indirectly from said portable control means.

22. Apparatus as set forth in claim 19, wherein power is transmitted along the lines to the decoders as an alternating-current signal; and
said means for transmitting feedback signals of the first and second types include means for selectively grounding one of the lines during an interruption of transmission of the alternating-current signal.

23. Apparatus as set forth in claim 22, wherein:
feedback signals of the first type are transmitted during a first interruption of the alternating-current signal;
feedback signals of the second type are transmitted during a second interruption of the alternating-current signal, said interruptions each occurring once for each transmission of a decoder address and on/off code; and
said control means within the encoder also includes storage means for storing feedback signals of the first type.

24. A digital irrigation control system in which both power and control signals are transmitted along the same conducting lines to control a plurality of switchable valves, said system comprising:
at least one decoder for decoding control signals, including decoder addresses and on/off codes;
means at said decoder for transmitting feedback signals of a first type indicating that an on/off code addressed to said decoder has been received;
portable control means connectable to the conducting lines to control the switchable valves, said portable control means including
means responsive to control signals transmitted along the lines and addressed to said portable control means, for transmitting feedback signals of the first type, indicating that said portable control means is connected to the lines,
manually operable means for selecting decoder control functions, and
means for transmitting feedback signals of a second type, to convey the selected decoder control functions; and an encoder including
means for detecting and storing feedback signals of said first and second types,
means for selecting for transmission on/off codes from a predetermined sequence of commands, if said portable control means is not connected to the lines,
means for selecting for transmission on/off codes determined by said feedback signals of the second type, if said portable control means is connected to the lines, and
means for encoding the selected on/off codes and decoder addresses onto the lines for transmission to said decoder and said portable control means.

25. A digital irrigation control system as set forth in claim 24, wherein:
power is transmitted along the lines in the form of an alternating-current signal; and
said means for encoding the selected on/off codes and decoder addresses includes half-wave rectification means for selectively suppressing current flow in one direction to encode in binary fashion.

26. A digital irrigation control system as set forth in claim 25, wherein:
said means for transmitting said feedback signals of the first type include means for selectively grounding one of the lines during a first interruption of said alternating-current signal following transmission of a decoder address and an on/off code; and
said means for transmitting said feedback signals of the second type include means for selectively grounding one of the lines during a second interruption of said alternating-current signal following transmission of a decoder address and an on/off code.

27. A digital irrigation control system as set forth in claim 24, wherein said manually operable means in said portable control means includes:
means for selecting a particular decoder to be held in an "on" condition; and
means for selecting a special function to be performed at said encoder;
whereby, if a particular decoder is selected to be held in an "on" condition, said portable control means transmits an "on" feedback signal of the second type following receipt of said particular decoder's address, and "off" feedback signals of the second type following receipt of other decoder addresses, said feedback signals of the second type being stored at said encoder and being subsequently transmitted instead of a normal sequence of on/off codes;
and whereby, if a special function is selected at said portable control means, an "on" feedback signal of the first type is transmitted following receipt of a decoder address reserved for the special function, said "on" feedback signal of the first type being stored at said encoder and being subsequently utilized to initiate the selected special control function.

28. A method of controlling operations of a plurality of switchable devices in a digital control system in which both power and control signals are transmitted along the same conducting lines from an encoder to a plurality of decoders, said method comprising the steps of:
encoding control signals for transmission with an alternating-current power signal along common conducting lines to the decoders, said encoding step including selectively rectifying the power signal and thereby selectively suppressing current flow in one direction to encode the control signals in a binary fashion;
decoding the control signals at least one decoder;
operating a switchable device at the decoder in accordance with the decoded control signals; and transmitting a feedback signal back to the encoder during a temporary interruption of the power signal, following the receipt of control signals intended for the decoder, to indicate the state of the switchable device at the decoder after said operating step.

29. A method as set forth in claim 28, wherein:

the control signals include decoder addresses and on/off codes; and said method further includes storing the decoder feedback signals at the encoder, and visibly displaying them as an indication of on/off conditions at the decoders.

30. A method as set forth in claim 29, wherein said step of transmitting a feedback signal includes:

interrupting transmission of the alternating-current signal from the encoder;

selectively grounding one of the lines at the decoder during the interruption; and monitoring the potentially grounded line at the encoder to detect the feedback signal.

31. For use in a digital control system in which both power and control signals are transmitted along the same conducting lines from an encoder to a plurality of decoders, a method for the control of switchable devices in the system from any desired point along the conducting lines, said method comprising the steps of:

connecting a portable operator at a desired location along the conducting lines;

periodically transmitting from the encoder a control signal addressed specifically to the portable operator;

manually selecting a control function at the portable operator;

monitoring at the portable operator all control signals transmitted by the encoder;

transmitting feedback signals to the encoder, in response to control signals monitored by the portable operator, the feedback signals being indicative of the selected control function; and automatically performing the selected control function at the encoder instead of performing control functions in accordance with a predetermined schedule.

32. A method as set forth in claim 31, and further including the steps of:

disconnecting the portable operator from the lines; and thereby resuming control functions at the encoder in accordance with the predetermined schedule.

33. A method as set forth in claim 31, wherein:

power is transmitted along the lines in the form of an alternating-current signal; and said steps of transmitting feedback signals include interrupting the alternating-current signal and momentarily grounding one of the lines.

34. A method as set forth in claim 31, and further including the steps of:

storing feedback signals received at the encoder from the portable operator; and selecting on/off codes from the stored feedback signals instead of in accordance with the predetermined schedule, if the portable operator is connected to the lines.

35. A method as set forth in claim 34, and further including the steps of:

transmitting other feedback signals from decoders in the system to indicate on/off conditions at the decoders; and receiving, storing and displaying these other feedback signals at the encoder, as on indication of on/off conditions at the decoders.

* * * * *

UNITED STATES PATENT AND TRADEMARK OFFICE
CERTIFICATE OF CORRECTION

PATENT NO. : 4,131,882
DATED : December 26, 1978
INVENTOR(S) : MICHAEL D. HOLLABAUGH and VINOD PANDAY It is certified that error appears in the above-identified patent and that said Letters Patent are hereby corrected as shown below:

Column 3, line 68, "cyle" should be (throughout) --cycle--.

Column 10, line 60, "specidic" should be --specific--.

Column 12, line 61, "gound" should be --ground--.

Column 13, line 21, "ttransmitted" should be --transmitted--;
         line 25, "that" should be --than--;
         line 39, "alterating" should be --alternating--;
         line 64, "an" should be --as-- (first occurrence).

Column 14, line 31, "black" should be --block--.

Column 15, line 30, "compraring" should be --comparing--.

Column 20, line 66, insert --at-- after "at".

Signed and Sealed this

Nineteenth Day of June 1979

[SEAL]

Attest:

RUTH C. MASON
Attesting Officer

DONALD W. BANNER
Commissioner of Patents and Trademarks